US009290392B2

(12) United States Patent
Muduli et al.

(10) Patent No.: US 9,290,392 B2
(45) Date of Patent: Mar. 22, 2016

(54) SHAPE PRESERVING CHEMICAL TRANSFORMATION OF ZNO MESOSTRUCTURES INTO ANATASE $TIO_2$ MESOSTRUCTURES FOR OPTOELECTRONIC APPLICATION

(75) Inventors: Subas K. Muduli, Pune (IN); Vivek V. Dhas, Pune (IN); Onkar S. Game, Pune (IN); Ashish P. Yengantiwar, Pune (IN); Satishchandra B. Ogale, Pune (IN)

(73) Assignee: Council of Scientific & Industrial Research (IN)

( * ) Notice: Subject to any disclaimer, the term of this patent is extended or adjusted under 35 U.S.C. 154(b) by 948 days.

(21) Appl. No.: 13/486,509

(22) Filed: Jun. 1, 2012

(65) Prior Publication Data

US 2013/0034491 A1 Feb. 7, 2013

(30) Foreign Application Priority Data

Aug. 5, 2011 (IN) .......................... 2220/DEL/2011

(51) Int. Cl.
*C01G 23/047* (2006.01)
*C01G 23/053* (2006.01)
*C01G 9/02* (2006.01)

(52) U.S. Cl.
CPC .............. *C01G 23/0536* (2013.01); *C01G 9/02* (2013.01); *C01P 2002/30* (2013.01); *C01P 2002/72* (2013.01); *C01P 2002/82* (2013.01); *C01P 2002/85* (2013.01); *C01P 2004/03* (2013.01); *C01P 2004/32* (2013.01); *C01P 2006/12* (2013.01)

(58) Field of Classification Search
CPC ........... C01G 23/0536; C01G 23/0047; C01G 23/00; C01G 23/022; C01G 9/02; C01G 9/006; C01P 2002/30; C01P 2002/72; C01P 2002/85; C01P 2002/82; C01P 2006/12; C01P 2004/03; C01P 2004/32; B05D 3/02; B05D 7/00; B82Y 40/00
See application file for complete search history.

(56) References Cited

PUBLICATIONS

Muduli et al (NPL: "Shape Preserving Chemical Transformation of ZnO Mesostructures Into Anatase TiO2 Mesostructures for Optoelectronic Application", Energy Environ. Sci., Jun. 2011, 4, pp. 2835-2839).*
Sandhage, "Materials 'Alchemy': Shape Preserving Chemical Transformation of Micro-to-Macroscopic 3-D Structures," TMS, 2010, pp. 32-43, vol. 62, No. 6.
Huang, et al., "Synergistic Effects of ZnO Compact Layer and TiCl4 Post-Treatment for Dye-Sensitized Solar Cells," Journal of Power Sources, Apr. 2012, pp. 257-264, vol. 204, No. 15.
Qiu, et al., "Fabrication of TiO2 Nanotube Film by Well-Aligned ZnO Nanorod Array Film and Sol-Gel Process," Thin Solid Films, 2007, pp. 2897-2902, vol. 515, No. 5.

* cited by examiner

*Primary Examiner* — Melvin C Mayes
*Assistant Examiner* — Smita Patel
(74) *Attorney, Agent, or Firm* — Blank Rome LLP; Michael C. Greenbaum; Jamie B. Tesfazion (57) ABSTRACT

The present application discloses a shape preserving chemical transformation of ZnO mesostructures into anatase $TiO_2$ mesostructures using controlled low temperature $TiCl_4$ treatment for optoelectronic applications.

10 Claims, 11 Drawing Sheets

FIG. 12 (A), 12(B), 12(C) and 12(D)

SHAPE PRESERVING CHEMICAL TRANSFORMATION OF ZNO MESOSTRUCTURES INTO ANATASE TIO$_2$ MESOSTRUCTURES FOR OPTOELECTRONIC APPLICATION

CROSS-REFERENCE TO RELATED APPLICATIONS

The present application is related to and claims the benefit of Indian Patent Application No. 2220/DEL/2011, filed Aug. 5, 2011, whose disclosure is hereby incorporated by reference in its entirety into the present disclosure.

FIELD OF THE INVENTION

The present invention relates to shape preserving chemical transformation of ZnO mesostructures into anatase TiO$_2$ mesostructures using controlled low temperature TiCl$_4$ treatment for optoelectronic applications.

BACKGROUND AND PRIOR ART OF THE INVENTION

Titanium dioxide (TiO$_2$) is perhaps one of the most widely used transition metal oxides in diverse applications due to its variety of unique and application-worthy properties. With the growing emphasis of the current science and technology on nanomaterials due to their unique and novel property domains, considerable efforts have been expended over the past decade to synthesize various metal oxides (including TiO$_2$) in the form of different phases, shapes, and functions using a variety of soft chemical and physical synthesis techniques. Depending on the use of a particular process, specific precursors/radicals, capping agents, temperature, pressure etc. a particular morphology of the nano system evolves. In the context of different applications such as photovoltaic, catalysis, electro-optics etc., controlled nanocrystal growth is intensely researched. In addition to the size and composition, the shape control of nanomaterials is an important variable to adapt to the properties for various applications. However, different oxides have their specific symmetry-dependent crystal growth habits which make the proposition of developing specific desired (shape) morphology a non-trivial proposition. For instance, ZnO can grow more easily into anisotropic structures while TiO$_2$ does not, unless efforts are made for facet control via selective capping.

Literature survey shows that the chemical transformation of inorganic nanocrystalline solids via diffusion or exchange of atoms is emerging as an attractive approach for nanostructure engineering in recent years. In particular, for transforming one ionic nanocrystal into another hetero-interfaced nanostructure, cation exchange reaction is shown to be a very useful process. It is generally assumed that the anionic structure of the crystal is conserved, while the cations undergo replacement during the exchange reaction due to their relatively smaller size and higher mobility. For instance, the morphology composed of a CdSe nanocrystal embedded in a CdS rod (CdSe/CdS) was exchanged to a PbSe/PbS nanorod via a Cu$_2$Se/Cu$_2$S structure keeping the seed size and position within the nanorod preserved. The morphology change in the cation exchange reactions of metal chalcogenide nanocrystals, CdE to MxEy (E=S, Se, Te and M=Pd, Pt) has been investigated by Son et al. Brock et al. have synthesized Ag$_2$Se wet gel monoliths by an ion exchange reaction of a monolithic CdSe wet gel and converted the same to an aerogel by drying under supercritical conditions.

TiCl$_4$ treatment of nanoparticulate TiO$_2$ films has been researched by several groups, especially by O'Regan and Bakker, in the context of the dye sensitized solar cell (DSSC) application, and a significant improvement in cell efficiency has been demonstrated following such a treatment. However, there have not been many studies on the possible beneficial use of such a treatment for other oxides.

ZnO has attracted considerable interest of the DSSC community due to its unique set of optoelectronic properties; however, the corresponding DSSC efficiencies are quite low. The pioneering work by Yang and coworkers showed that DSSCs based on ZnO nanowire/TiO$_2$ core-shell structures have higher charge separation yields. It is now known that TiO$_2$ coating of ZnO nanostructure improves the DSSC efficiency, and in most cases such coating is applied by the expensive atomic layer deposition method. Only recently, Atienzar et al. reported a simple TiCl$_4$ treatment that led the surface coating of TiO$_2$ on ZnO core (equivalent of the TiCl$_4$ post treatment of TiO$_2$ structured materials) leading to improved DSSC performance. However, no details were provided about the effects of TiCl$_4$ on ZnO morphology. Recently, the effect of TiCl$_4$ treatment on porous ZnO photo-electrode has also been examined by Murakami et al.

An article titled "Materials "Alchemy": Shape Preserving Chemical Transformation of Micro-to-Macroscopic 3-D Structures" by Kenneth H. Sandhage, published in TMS Vol. 62, No. 6 (2010) pp. 32-43 gives an overview on Shape Preserving Chemical Transformations. The article states;

"The scalable fabrication of nanostructured materials with complex morphologies and tailorable chemistries remains a significant challenge. One strategy for such synthesis consists of the generation of a solid structure with a desired morphology (a "preform"), followed by reactive conversion of the preform into a new chemistry. Several gas/solid and liquid/solid reaction processes that are capable of such chemical conversion into new micro-to-nanostructured materials, while preserving the macroscopic-to-microscopic preform morphologies, are described in this overview."

An article titled "Synergistic effects of ZnO compact layer and TiCl$_4$ post-treatment for dye-sensitized solar cells" by NiuHuanga et al., published in Journal of Power Sources, Volume 204, 15 Apr. 2012, Pages 257-264 discloses the interaction between ZnO compact layer and TiCl$_4$ post-treatment on TiO$_2$ photo electrode for dye sensitized solar cell (DSSC). Photo electrode combined the two modifications is designated as ZnO+2 l+TiCl$_4$. It is further disclosed that after the TiCl$_4$ treatment the ZnO compact layer transforms to a bi-functional layer, which suppresses back electrons transfer from FTO to electrolyte and reduces the FTO/TiO$_2$ interfacial resistance. In addition, the newly formed TiO$_2$ coating generated by TiCl$_4$ post-treatment contains abundant and well dispersed Zn element, which further facilitates electron transfer at TiO$_2$ layer. Meanwhile, the electron lifetime in ZnO+2 l+TiCl$_4$ is the longest. Consequently, the overall energy conversion efficiency of the cell with ZnO+2 l+TiCl$_4$ is significantly enhanced to 8.9%, which is 8.8% higher than that with pure TiCl$_4$ post-treatment and 17.7% higher than that without any treatment.

An article titled "Fabrication of TiO$_2$ nanotube film by well-aligned ZnO nanorod array film and sol-gel process" by J Qiu et al. published in Thin Solid Films (2007), Volume: 515, Issue: 5, Pages: 2897-2902 discloses high density TiO$_2$ nanotube film with hexagonal shape and narrow size distribution which was fabricated by templating ZnO nanorod array film and sol-gel process. Well-aligned ZnO nanorod array films obtained by aqueous solution method were used as template to synthesize ZnO/TiO$_2$ core-shell structure through sol-gel process. Subsequently, TiO$_2$ nanotube array films survived by removing the ZnO nanorod cores using wet-chemical etching. Polycrystalline anatase TiO$_2$ nanotube films were similar to 1.5 μm long and similar to 100 nm in inter diameter with a wall thickness of similar to 10 nm.

Inspite of the above disclosures in the art for chemical conversion into micro-to-nanostructured materials, while preserving the macroscopic-to-microscopic preform morphologies, chemical transformation of ZnO mesostructures to TiO$_2$ mesostructures using simple chemical treatment is however not explored hitherto.

In the context of the importance of applications of shape controlled metal oxides in electro-optics, photovoltaics etc. the present invention lays emphasis in providing shape preserving chemical transformation of ZnO mesostructures to TiO$_2$ mesostructures using simple chemical treatment.

OBJECTS OF THE INVENTION

Main object of the present invention is to provide chemical transformation of ZnO mesostructures to anatase TiO$_2$ which exhibits a remarkable nominally shape-preserving property.

Another object of the present invention is to provide shape preserving chemical transformation of ZnO mesostructures into anatase TiO$_2$ mesostructures using controlled low temperature TiCl$_4$ treatment for optoelectronic applications.

SUMMARY OF THE INVENTION

Accordingly, present invention provides a process for the shape preserving chemical transformation of ZnO mesostructures into anatase TiO$_2$ mesostructures comprising the steps of:
  i. treating the Zinc oxide mesostructures with Titanium tetrachloride (TiCl$_4$) solution at temperature in the range of 60 to 70° C. for period in the range of 20 to 30 min;
  ii. annealing the TiCl$_4$ treated Zinc oxide mesostructures as obtained in step (i) at a temperature in the range of 400 to 450° C. for period in the range of 20 to 30 min to obtain anatase TiO$_2$ mesostructures.

In an embodiment of the present invention, Zinc oxide mesostructures are selected from the group consisting of Zinc oxide rods, Zinc oxide spheres, Zinc oxide flakes and Zinc oxide flowers.

In yet another embodiment of the present invention, the Zinc oxide mesostructures are coated over Titanium dioxide nanoparticles film and annealed at a temperature in the range of 400 to 450° C. for 50 to 60 min before treating with Titanium tetrachloride (TiCl$_4$) solution.

In yet another embodiment of the present invention, the Zinc oxide mesostructures are optionally grown on Fluorine doped Tin oxide (FTO) or Indium doped Tin oxide (ITO) glass plates before treating with Titanium tetrachloride (TiCl$_4$) solution.

In yet another embodiment of the present invention, the Zinc oxide mesostructures treated with Titanium tetrachloride (TiCl$_4$) solution are washed with deionized water.

In yet another embodiment of the present invention, the thickness of anatase TiO$_2$ mesostructures is in the range of 5-12 μm.

In yet another embodiment of the present invention, the diameter of anatase TiO$_2$ mesostructure is ranging from 500 nm to 2 μm.

In yet another embodiment of the present invention, anatase Titanium dioxide mesostructures prepared by the aforesaid process.

In yet another embodiment of the present invention, anatase Titanium dioxide mesostructures are useful for optoelectronic applications.

In yet another embodiment of the present invention, the dye sensitized solar cells utilizing said mesostructures exhibit efficiency in the range of 3.5% to 7%.

In an embodiment, present invention provides a process for the shape preserving chemical transformation of ZnO mesostructures into anatase TiO$_2$ mesostructures with remarkable nominally similar shapes comprising the steps of;
  a. providing films of ZnO mesostructures grown on fluorine doped tin oxide (FTO)/Indium doped tin oxide (ITO) glass plates;
  b. treating films of ZnO mesostructures as provided in step (a) with TiCl4 solution at temperature in the range of 60 to 70° C. for period in the range of 20 to 30 min; and
  c. washing the treated films of step (b) with de ionized water followed by annealing at temperature in the range of 400 to 450° C. for period in the range of 20 to 30 min to obtain anatase TiO2 mesostructures.

Alternatively, in another embodiment, present invention provides a process for the shape preserving chemical transformation of ZnO mesostructures into anatase TiO$_2$ mesostructures with remarkable nominally similar shapes optionally comprising the steps of;
  1. coating a layer of ZnO mesostructures over TiO2 nanoparticles film;
  2. annealing the films of step (i) at temperature in the range of 400 to 450° C. for period in the range of 50 to 60 min;
  3. treating the films of step (ii) with TiCl4 solution at temperature in the range of 60 to 70° C. followed by second annealing at temperature in the range of 400 to 450° C. for period in the range of 20 to 30 min to obtain anatase TiO2 mesostructures.

BRIEF DESCRIPTION OF FIGURES

FIGS. 3(A) and 3(B): The respectively SEM images of ZnOFlr and TiCl$_4$ treated ZnOFlr. The inset FIG. 3(b) is the zoomed-in version of one of the flowers of TiO$_2$ (TiCl$_4$ treated ZnOFlr).

FIG. 4(A) FE-SEM of ZnO rods, FIG. 4(B) TiCl$_4$ treated ZnO rods on FTO and FIG. 4(C) schematic diagram of mechanism involving conversion of ZnO rods to TiO$_2$ hollow tubes by TiCl$_4$ treatment of ZnO rods.

DETAILED DESCRIPTION OF THE INVENTION

Present invention describes a process for shape preserving chemical transformation of ZnO mesostructures into anatase $TiO_2$ mesostructures with remarkable nominally similar shapes using controlled low temperature $TiCl_4$ treatment. The chemical transformation of ZnO mesostructures by $TiCl_4$ treatment results into anatase $TiO_2$ without changing its size and shape.

Accordingly, the present invention describes a process for shape preserving chemical transformation comprising treating ZnO mesostructure films grown on FTO/ITO glass plates with $TiCl_4$, followed by washing and annealing to obtain structured material of anatase $TiO_2$. The present invention also provides the synthesis of various ZnO mesostructures by hydrothermal and co-precipitation methods and their remarkable and complete transformation into anatase $TiO_2$ mesostructures with remarkable nominally similar shapes using controlled low temperature $TiCl_4$ treatment.

The ZnO mesostructures grown on FTO/ITO glass plates is obtained by doctor blade method.

The present invention describes the synthesis of various ZnO mesostructures in the form of rods, spheres, flakes and flower-like morphologies by hydrothermal and co-precipitation methods.

The present invention describes the application of these converted $TiO_2$ mesostructures for light harvesting in Dye Sensitized Solar Cells (DSSC) for enhanced Optoelectronic Applications.

In the geometric hierarchy, there are basically three different levels of scales, namely, the macrostructure level, the mesostructure level, and the microstructure level. The macrostructure level represents the gross surface geometry, typically expressed as a polygonal mesh or parametric spline surface. The microstructure level involves surface microfacets that are visually indistinguishable. The mesostructure level represents geometric details that are relatively small but still individually visible such as bumps or dents on a surface. Efficient mesostructure reconstruction methods can contribute greatly to high-quality graphics models in terms of fine scale surface geometric details.

The process for the shape preserving chemical transformation of ZnO mesostructures into anatase $TiO_2$ mesostructures with remarkable nominally similar shapes comprises;
1. providing films of ZnO mesostructures grown on FTO/ITO glass plates;
2. treating films of ZnO mesostructures of step (1) with TiCl4 solution at 70° C. for about 30 min; and
3. washing the treated films of step (2) with D.I. water followed by annealing at 450° C. for 30 min to obtain anatase TiO2 mesostructures.

The films employed in the process may be obtained by growing ZnO mesostructures directly on FTO and/or ITO glass plates as substrates or may be prepared from nanoscale powder samples on FTO by doctor blading method.

The thickness of the film obtained by growing ZnO mesostructures directly on FTO and/or ITO glass plates as substrates is 5μ.

The basic exchange reaction operative in the conversion of $ZnO$ to $TiO_2$ is shown in Scheme 1.

Scheme 1: Reaction involved in chemical transformation of $ZnO$ to $TiO_2$

The reaction occurs via cation exchange between $Zn^{2+}$ and $Ti^{4+}$ ions. These exchange reactions can be qualitatively understood in terms of hard-soft acid-base theory (soft acids react faster and form stronger bonds with soft bases, whereas hard acids react faster and form stronger bonds with hard bases, all other factors being equal). $Ti^{4+}$ is a harder acid than $Zn^{2+}$. Thus $Ti^{4+}$ binds strongly with the $O^{2-}$ anion to form $TiO_2$. The conversion of ZnO structured material to $TiO_2$ structured materials is strongly favored by a thermodynamic driving force of about −249 kJ/mole.

Alternately, doctor blading method is used to make $TiO_2$ nanoparticle film over which a layer of ZnO mesostructures (flowers) are coated to obtain film of thickness of about 15 μm which is subjected to annealed at 450° C. for 60 min and these films are further treated with $TiCl_4$ solution at 70° C. followed by second annealing at 450° C. for 30 min to obtain $TiO_2$ mesostructures (flowers) of the thickness of 11 μm.

The thickness of the film obtained by doctor blading method is ~12 μm which is reduced to ~7 μm after $TiCl_4$ treatment. The reduction of thickness after $TiCl_4$ treatment can be attributed to some soluble reaction products, which get washed out during the process.

The ZnO mesostructures of the present invention are in the form of rods, spheres, flakes and flower-like morphologies. The chemical transformation of ZnO mesostructures by $TiCl_4$ treatment results into anatase $TiO_2$ without changing its size and shape. The present invention provides process for the preparation of ZnO mesostructures by hydrothermal and co-precipitation method.

1. Preparation of ZnO Flowers

ZnO flowers are synthesized by hydrothermal route using high purity zinc acetate and NaOH. For obtaining ZnO flower aqueous solution of zinc acetate is prepared and magnetically stirred. After the dissolution of zinc acetate, aqueous solution of NaOH is added to the above solution. This solution is transferred into a Teflon lined stainless steel autoclave. It is then sealed and maintained at 180° C. for 2 h. After the reaction a white colored solid powder is recovered by centrifugation followed by washing with distilled water and ethanol to remove the residual ions in the final product. Then the powder (ZnO Flowers) is finally dried in air.

Preparation of ZnO Rods on FTO and ITO

Zinc acetate, Zinc nitrate, Hexamethylenetetramine (HMT) and Sodium Hydroxide Pellets are used as precursors for ZnO rod growth. Zinc acetate solution is prepared in methanol and is kept under stirring. Then sodium hydroxide solution (prepared in Methanol) is added drop wise till the solution attained slight milky color and is used as seed solution. Fluorine doped tin oxide (FTO) and Indium doped tin oxide (ITO) glassplates are used as substrates for growth of ZnO rods. The substrates are mounted on the spin coater having a preset rotation speed of 2500 rpm for 30 sec and then spin coating is carried out using freshly prepared seed solution. The process is repeated continuously until the transparent substrate turned slightly opaque. Finally the substrates are annealed for better adherence of ZnO nanoparticles which act as nucleating sites for the growth of ZnO rods.

For facile growth of ZnO rods, equimolar solutions of Zinc Nitrate and hexamethylenetetramine are separately prepared using de-ionized water as solvent. The seeded substrates are immersed into the solution and the solution temperature is maintained at 95° C. under slow stirring. The depositions are carried out for time duration of 3 hour. Finally, the deposits are annealed for removal of moisture and for improving the adhesion.

2. Preparation of ZnO Spheres and Flakes

The ZnO sphere like morphology is synthesized at room temperature by co-precipitation method using zinc acetate, polyvinyl pyrrolidone and sodium hydroxide. Aqueous solution of zinc acetate is prepared and magnetically stirred. Polyvinyl pyrrolidone (capping agents) is dissolved in de-ionized water and added to the zinc acetate solution. Then aqueous solution of NaOH is added drop wise to the above solution. A white colored solid powder is obtained and recovered by centrifugation followed by washing with de-ionized water. Then, the powder is finally dried in air. The ZnO flakes were obtained from a commercial source (Smart NanoZ, Pune, India).

3. Preparation of $TiO_2$ Nanoparticles

Nanocrystalline $TiO_2$ is prepared by using a simple hydrothermal method. Titanium Isopropoxide is hydrolyzed by adding de-ionized water and then sonicated for 5 minutes. The solution is transferred to Teflon lined autoclave vessel along with $H_2SO_4$. This autoclave vessel is kept for 24 Hrs. The resulting product is washed thoroughly with de-ionized water and dried in a dust proof environment to produce the powder of $TiO_2$ nanoparticles.

Results and Discussions

Figure 1:
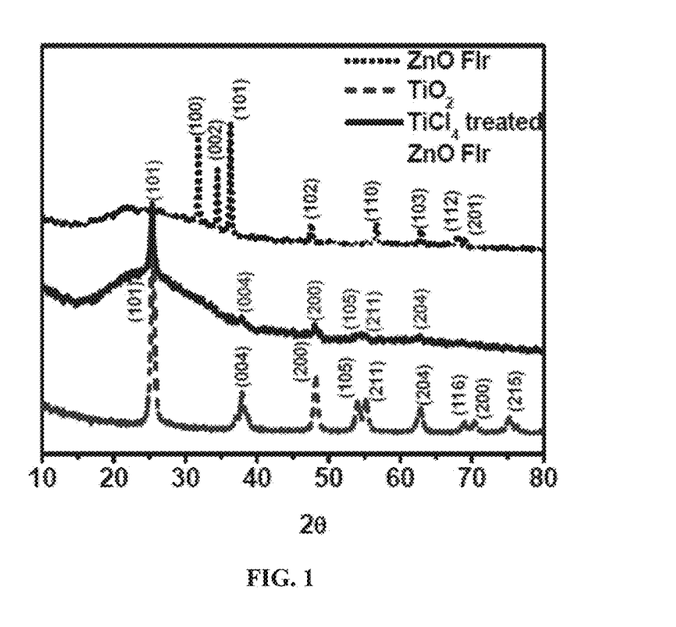
FIG. 1: XRD data of ZnO Flower (Flr), TiO$_2$ and TiCl$_4$ treated ZnO Flower (Flr).
Figure 7A:
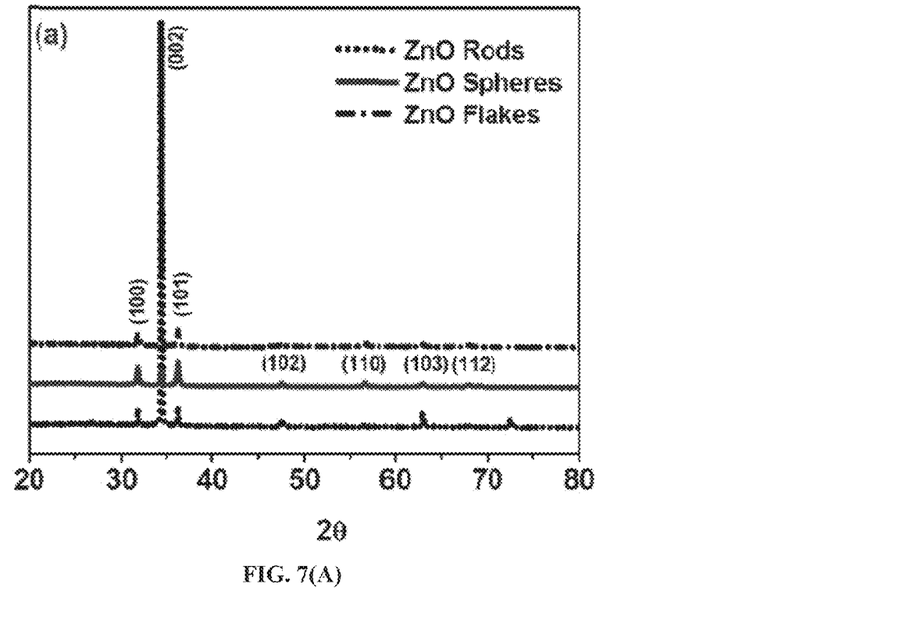
FIG. 7: XRD data of (A) ZnO (Rods, Spheres, Flakes), (B) TiCl$_4$ treated ZnO (Rods, Spheres, Flakes).
Figure 7B:
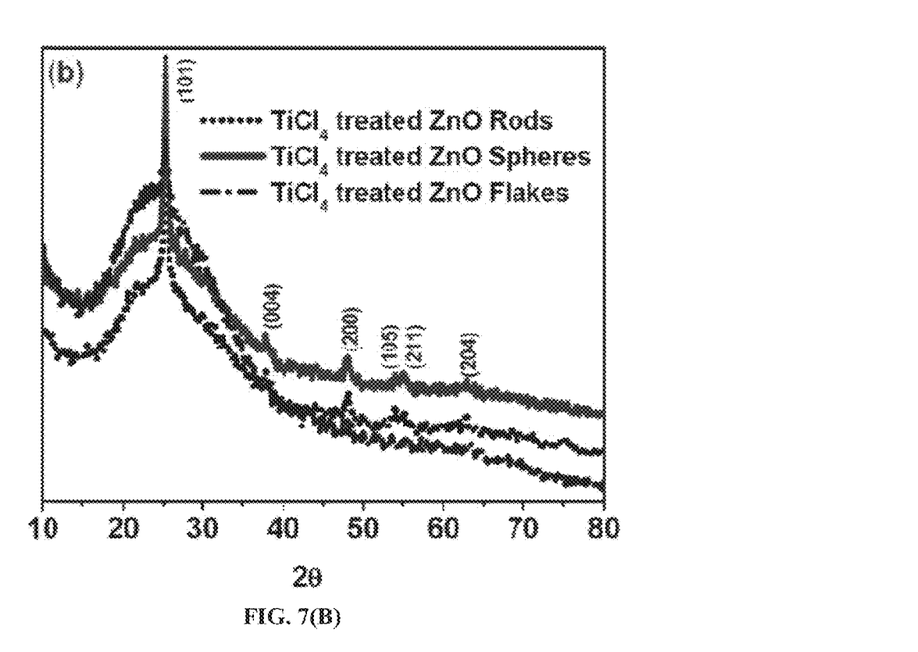

FIG. 1 shows the X-ray diffraction (XRD) patterns of ZnO Flower (Flr) and $TiCl_4$ treated ZnOFlr film on the glass substrate. As can be seen from the XRD pattern, the 2θ values at 31.8, 34.4, 36.3, 47.6, 56.6, 62.8, 67.9 and 69.2 correspond to wurtzite ZnO (PCPDFWIN #800075). The XRD data for the case of $TiCl_4$ treated ZnO show clear signatures of pure anatase $TiO_2$ phase (PCPDFWIN #211 272) at 25.3, 37.9, 48.2, 54.1, 55.2 and 62.9. The complete absence of ZnO peaks clearly indicates that following the stated $TiCl_4$ treatment, the ZnO phase converts fully to anatase $TiO_2$. Several other morphologies such asspheres, flakes etc. were also studied and the corresponding XRD data are presented in FIG. 7. These too exhibit complete transformation to anatase $TiO_2$ form.

Figure 2:
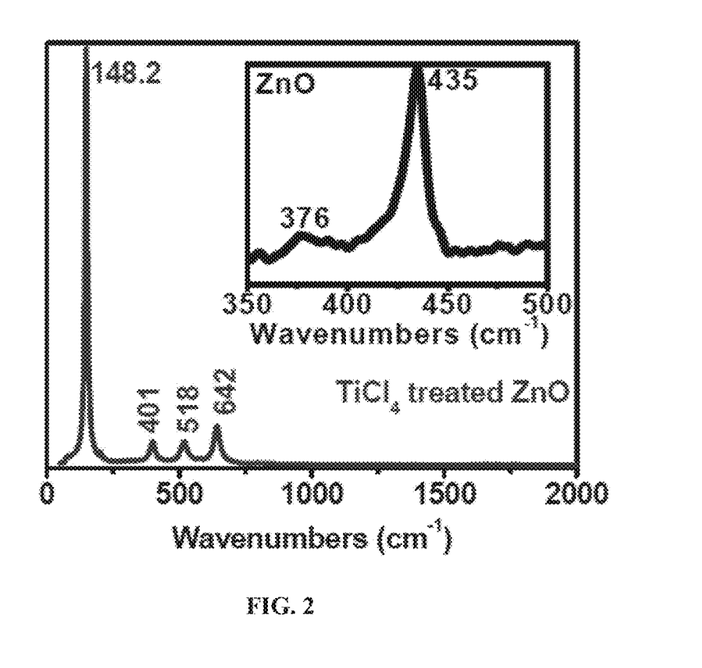
FIG. 2: Raman spectra of TiCl$_4$ treated ZnOFlr and ZnOFlr (inset).
Figure 8A:
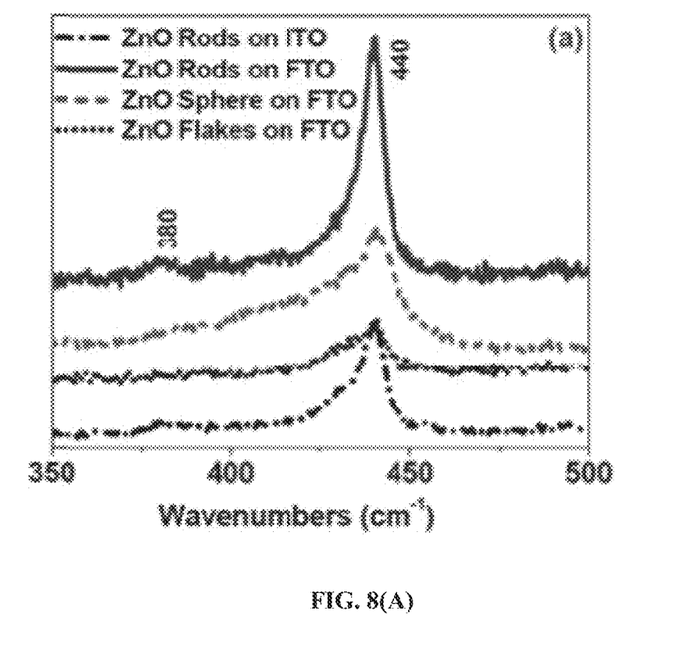
FIG. 8: Raman Spectra of (A) ZnO (Rods, Spheres and Flakes) and (B) TiCl$_4$ treated ZnO (Rods, Spheres and Flakes).
Figure 8B:
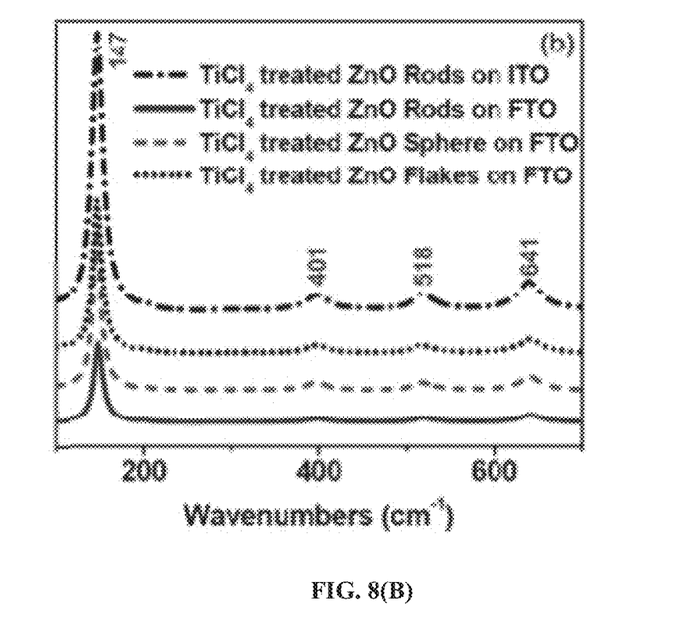

The Raman spectrum for ZnOFlr and $TiCl_4$ treated ZnOFlr is shown in FIG. 2. The Raman spectrum for the case of ZnO in FIG. 2 (inset) shows the clear signatures at about 376 and 435 $cm^{-1}$ expected for this oxide. The Raman peaks at 148.2, 401, 518 and 642 $cm^{-1}$ in FIG. 2 are characteristic of pure anatase $TiO_2$ phase. No peak corresponding to ZnO was observed after $TiCl_4$ treatment of ZnO, which indicates complete conversion from ZnO to anatase $TiO_2$ by the stated $TiCl_4$ treatment. The Raman spectra of other $TiCl_4$ treated ZnO structured materials are shown in FIG. 8.

Figure 3A:
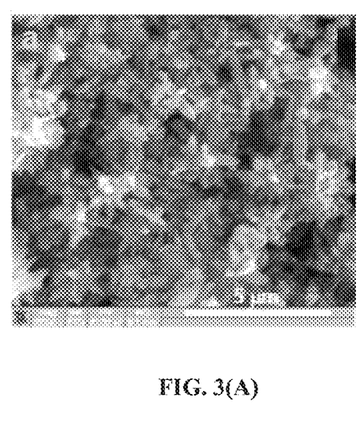
Figure 3B:
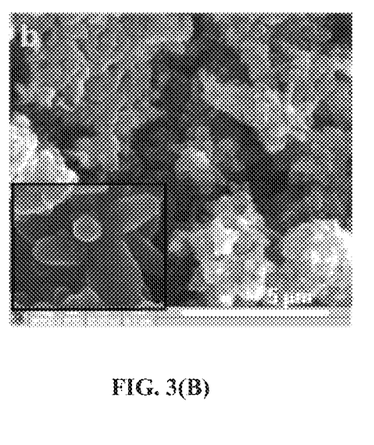

FIGS. 3(a) and (b) represents the SEM images of ZnOFlr film and $TiCl_4$ treated ZnOFlr film, respectively, which clearly confirms that the morphology remains nominally intact after the $TiCl_4$ treatment of ZnOFlr. Interestingly the latter $TiCl_4$ treated case for which XRD shows pure anatase $TiO_2$ phase is seen to retain the flower like morphology of the parent ZnO mesostructure, implying a nominally shape preserving chemical transformation. It is observed that in FIG. 3(b) the necking between the flowers takes place after the $TiCl_4$ treatment of ZnOFlr which is helpful for the transport of electrons in DSSC as discussed later. Such dense branched hierarchical morphology is of great value in nanoparticle films for solar cell and other optoelectronic applications for reasons of good charge carrier transport and light harvesting effects. The inset of FIG. 3(b) shows a zoomed-in version of one of the flowers of $TiO_2$ ($TiCl_4$ treated ZnOFlr).

Figure 9:
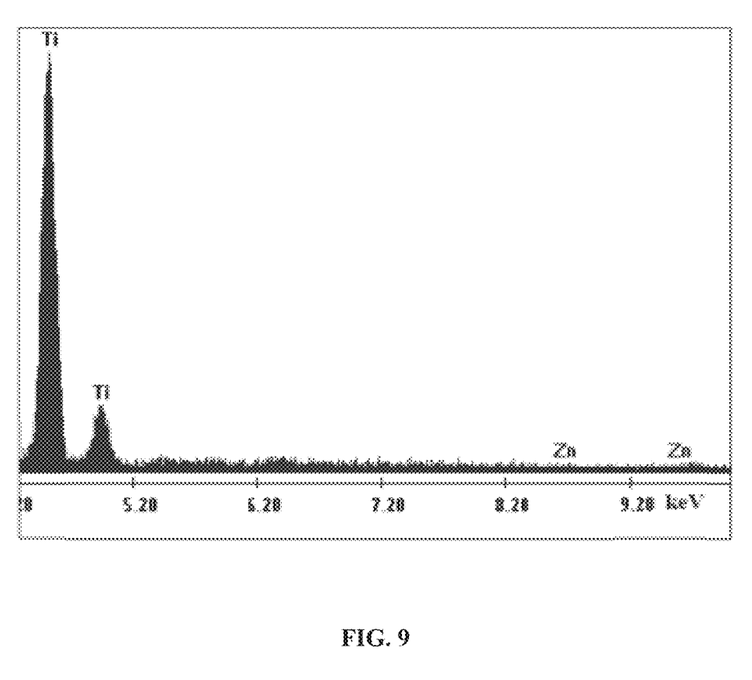
FIG. 9: Energy dispersive x-ray (EDX) data of TiCl$_4$ treated ZnO.
Figure 10A:
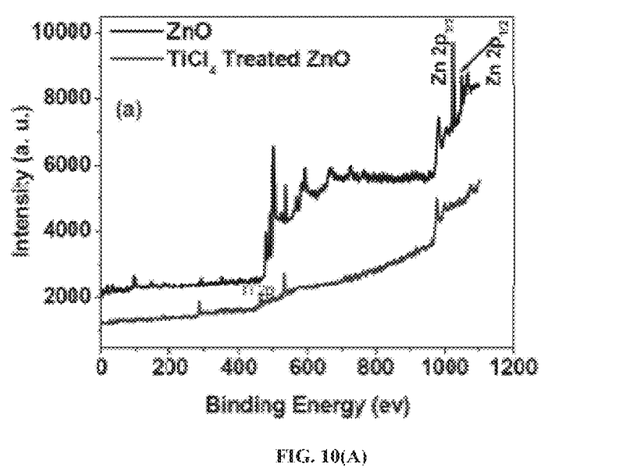
FIG. 10: XPS (X-ray photoelectron spectroscopy) data of (A) ZnO and TiCl$_4$ treated ZnO, (B) Presence and absence of Zn in ZnO and TiCl$_4$ treated ZnO respectively, and (C) Presence of Ti in TiCl$_4$ treated ZnO$_5$.
Figure 10B:
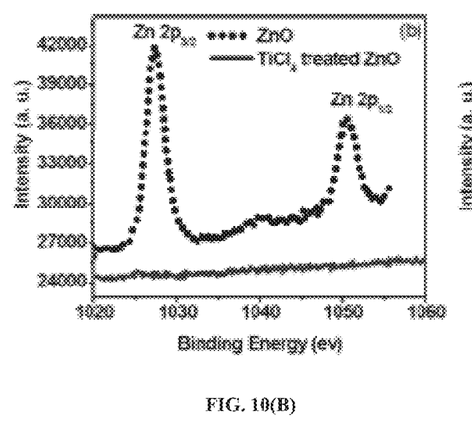
Figure 10C:
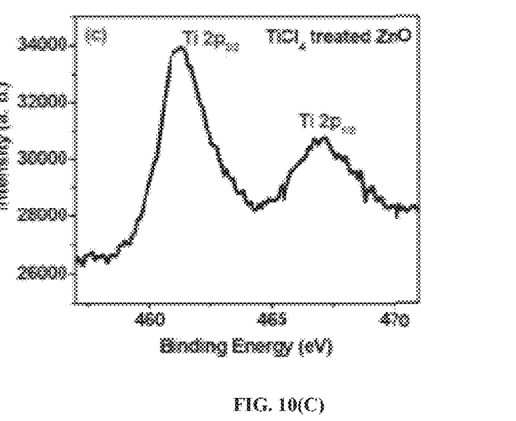

The shape preserving transformation of ZnOFlr to $TiO_2$ Flr seen here must occur through the cation exchange reaction between Zn2+ and Ti4+ ions as anticipated and mentioned earlier. FIG. 9 shows the energy dispersive x-ray (EDX) data for the image of FIG. 3(b) indicating a complete absence of Zinc for the case of $TiCl_4$ treated ZnO consistent with complete ion exchange. The XPS data shown in FIG. 10 further confirm the complete absence of Zn in the case of $TiCl_4$ treated ZnO.

Figures 4A, 4B, 4C:
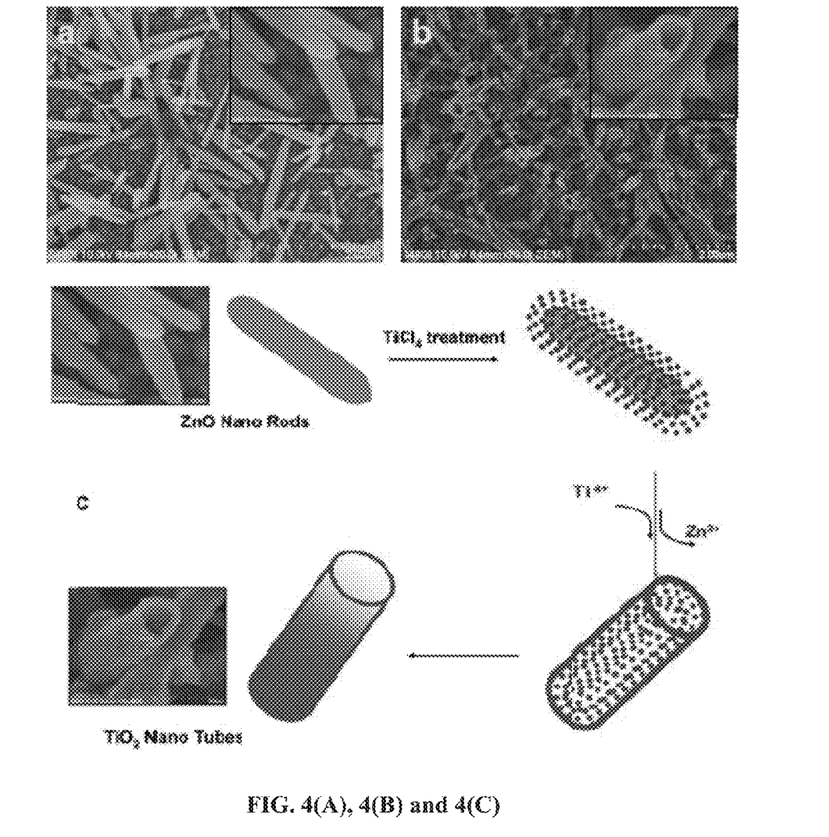
Figures 11A, 11B, 11C, 11D:
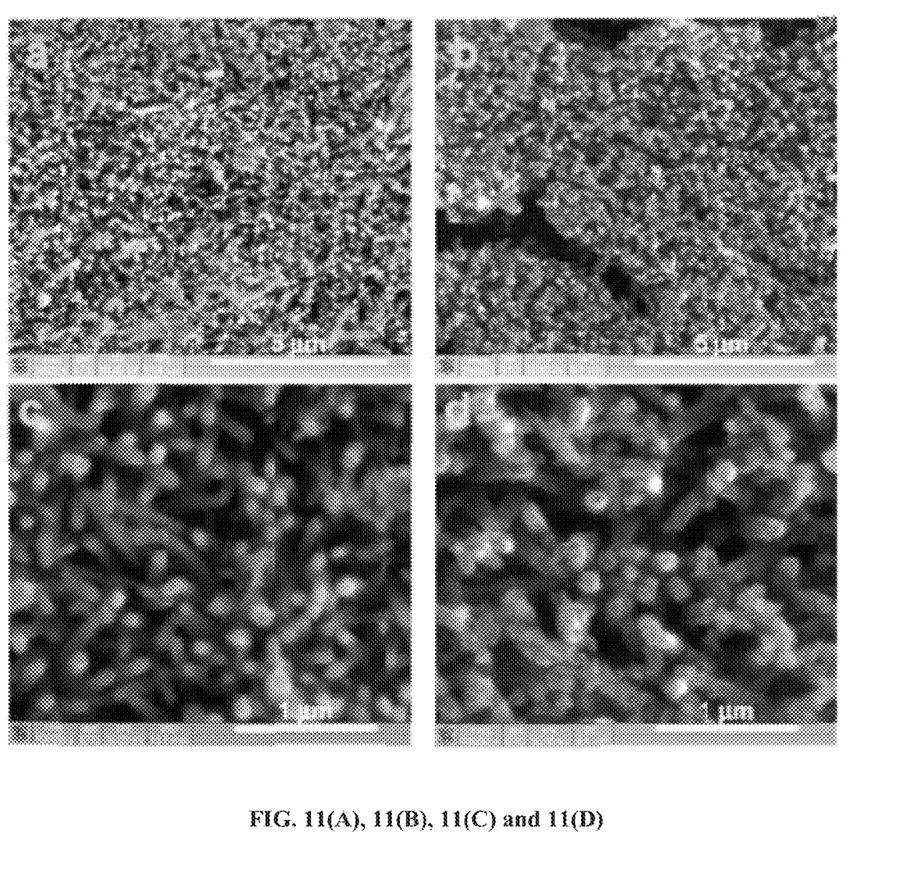
FIG. 11: SEM Data of ZnO rods (A) & (C) and TiCl4 treated ZnO Rods (B) & (D) on ITO.

The FE-SEM image of hexagonal shaped ZnO rods on FTO substrate is shown in FIG. 4(a). After $TiCl_4$ treatment of ZnO rods on FTO, all the ZnO rods are seen to get converted to anatase $TiO_2$ structure of nominally similar shape (FIG. 4(b)) but interestingly as hollow tubes. The schematic diagram of suggested mechanism involving conversion of ZnO rods to hollow anatase $TiO_2$ tubes is shown in FIG. 4(c). During the $TiCl_4$ treatment, all the Ti4+ ions are first adsorbed on the surface of ZnO rods and then Ti4+ ions and Zn2+ ions are exchanged slowly among themselves via ion exchange mechanism. There may be two possible scenarios for this ion exchange reaction (i) the new Ti4+ ions adsorbed on ZnO rods diffuse inward continuously, resulting in a directional migration of the reaction interface towards the core, or (ii) The Ti4+ ion diffusion is limited and core species (Zn2+) diffuse outward, generating a void space inside the rods. The $Zn^{2+}$ ions exchanged by Ti4+ ions would combine with Cl-ions present in the solution to form $ZnCl_2$ (which is soluble in water thereby coming out as side-product) whereas the Ti4+ ions would take the place of $Zn^{2+}$ via diffusion to form $TiO_2$ as major product. The effect of the $TiCl_4$ treatment on properly aligned ZnO rods on ITO substrate is brought out in FIG. 11.

The BET surface area data on the ZnOFlr system before and after its conversion into anatase $TiO_2$ Flrs is given in Table-1. The area is seen to be enhanced from about 5.9 m2/gm to 30.5 $m^2$/g, i.e. by a factor of about 5. This is consistent with change from a rod to a tube structure which would increase the area by a factor of about 2; the extra multiplying factor being added by the roughness enhancement.

Figure 5A:
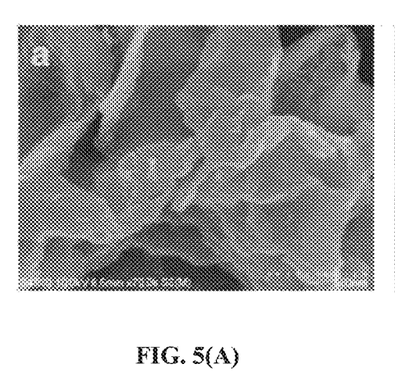
FIG. 5: FE-SEM (Field Emission Scanning Electron Microscope) of ZnO flakes (A) and TiCl$_4$ treated ZnO flakes (B) on FTO.
Figure 5B:
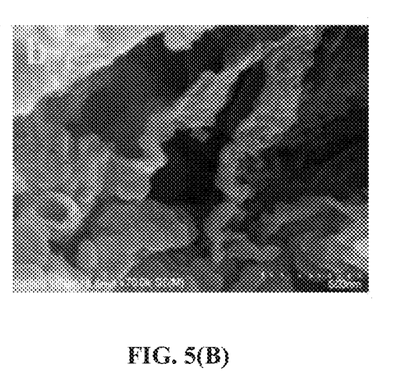

In FIG. 5(a), flake-like morphology of ZnO is shown, which was achieved by a special synthesis protocol. Very interestingly, by using the $TiCl_4$ treatment of these ZnO flakes, flake-like $TiO_2$ structures could be obtained, replicating the original morphology, as shown in FIG. 5(b).

Figure 12:
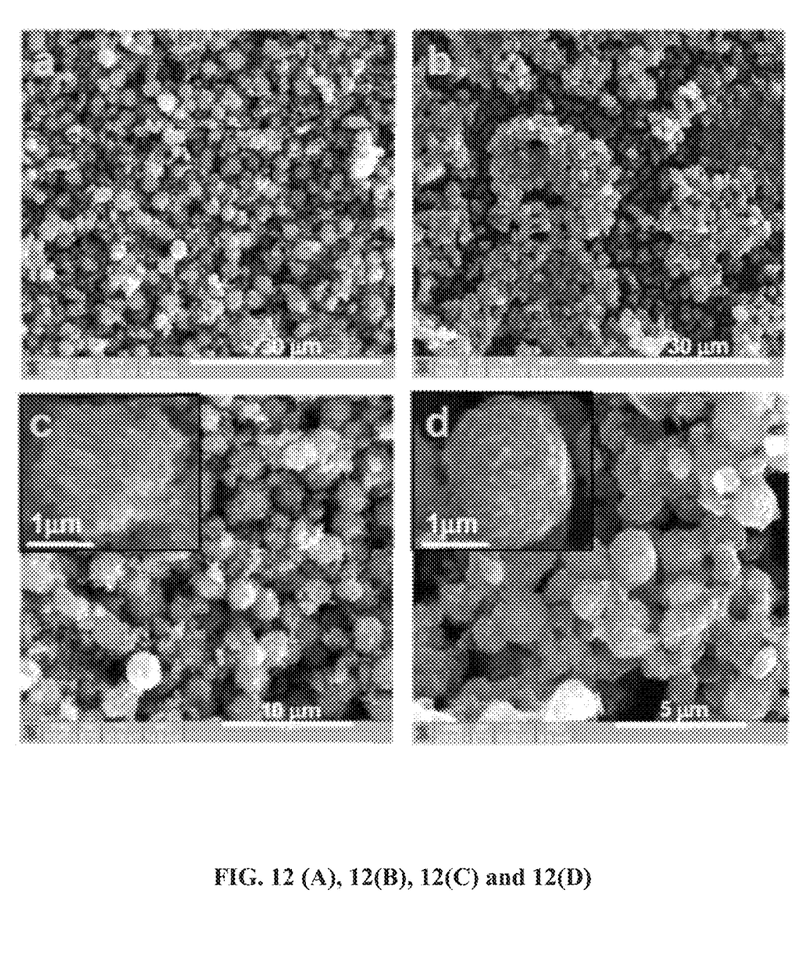
FIG. 12: SEM Data of ZnO capped with PVP (A) & (C) and TiCl4 treated ZnO capped with PVP (B) & (D) on FTO.

The above explanation collectively shows that the suggested treatment is not only facile but versatile in transforming oxide phase by preserving shapes in the broad sense. Indeed even hierarchically structured ZnO mesosystem is also converted to hierarchically structured anatase $TiO_2$ with diameter ranging from 1 μm to 2 μm by $TiCl_4$ treatment keeping the morphology broadly conserved, as shown in FIG. 12.

In another embodiment, the $TiO_2$ mesostructures of the present invention is used in Dye Sensitized Solar Cells (DSSC) as light harvesters because of enhanced light scattering in the visible region thereby enhancing the path length of incident light within the nanocrystalline $TiO_2$ electrode.

In order to investigate the role of $TiO_2$ mesostructures obtained after $TiCl_4$ treatment of ZnO mesostructures as light harvesters in $TiO_2$ based DSSC, double layer structures (TZFT film) were made with 7 μm thick nanocrystalline anatse $TiO_2$ with an over layer (4 μm) of $TiCl_4$ treated ZnOFlr (implying effectively an anatase $TiO_2$ flower morphology). $TiCl_4$ treated films (~11 μm thick) with only nanocrystalline TiO$_2$ and the commercial Degussa P25 without such an overlayer were also prepared under similar conditions for comparison. All films had an active area of 0.25 cm$^2$.

Figure 6:
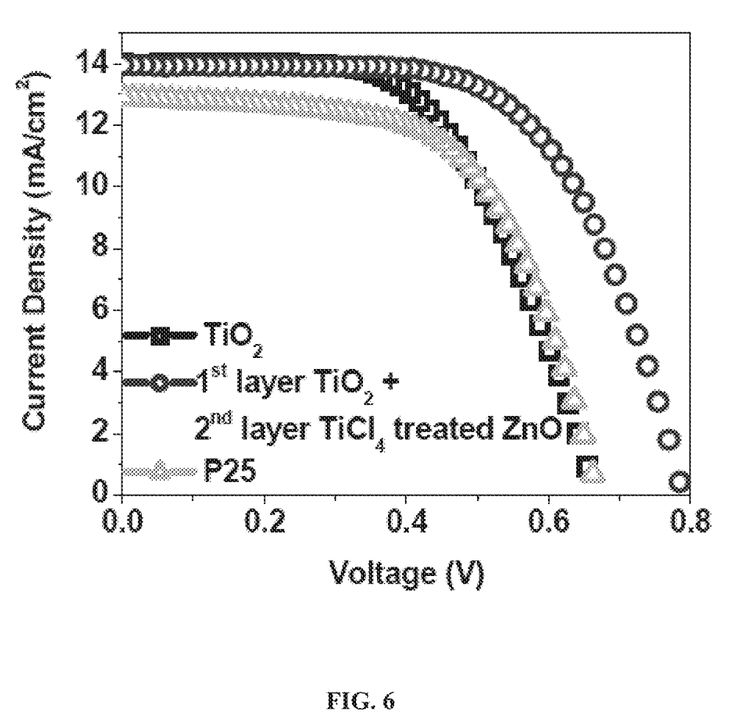
FIG. 6: Comparison of Solar cell characteristics for DSSCs made with the nanocrystalline TiO2-layer-based TiCl$_4$ treated ZnOFlr over layer with Nanocrystalline TiO$_2$ and commercial Degussa P25.

FIG. 6 (see also the Table 2) compares the photovoltaic characteristic of all the three cases. The optimized mean efficiencies obtained by our procedure for P25 and Nanocrystalline TiO$_2$ are about 5.2% and 5.4%, respectively. After TiCl$_4$ treated ZnO is introduced as an over layer, the conversion efficiency improved from 5.4% to 6.9%, a 28% increment. It is important mention here that higher efficiencies have been reported in the literature even for the nano-TiO$_2$ and P25 cases using the same dye, but achieving such efficiencies requires simultaneous optimization of several parameters and significant experience and skill in cell architecture design.

In this invention the emphasis is on shape preserving transformation and our attempt here is to demonstrate the possible use of such anisotropic TiO$_2$ architectures in device improvements; the observed enhancement being significant within our current skill set in device making.

It can be seen that the open circuit voltage (VOC) of TZFT film (0.78 V) is almost 18% higher than that for TiO$_2$ nanocrystalline film (0.66 V) and P25 film (0.67 V). Also the fill factor is higher for the case of TZFT films (~63%) than the case of TiO$_2$ film (58%) and P25 (~60%). Increase in VOC and Fill Factor can be correlated with decreased electron-hole recombination at TiO$_2$-dye-electrolyte interface.

Decreased recombination in TZFT film can be attributed to high quality of TiO$_2$ Flr (over layer) formed after TiCl$_4$ treatment of ZnOFlr. It has been shown that the TiO$_2$ formed after TiCl$_4$ treatment has conduction band edge potential 80 mV lower than conventional TiO$_2$ nanoparticles thereby causing 20 fold decreases in electron-electrolyte recombination rate constant which is responsible for increase in Voc. No substantial increment in JSC was observed for the case of TZFT films. The short circuit current density (JSC) for TZFT film is 14 mA/cm$^2$ which is about the same as that for the case of the TiO$_2$ film (12.9 mA/cm2 for P25). This can be attributed to less dye adsorption in the TZFT films.

Figure 13:
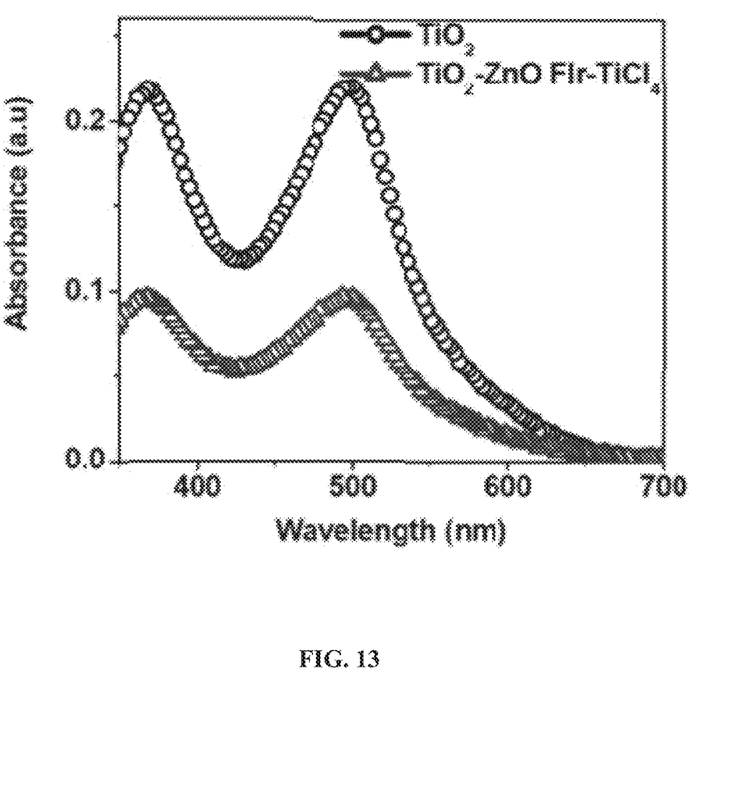
FIG. 13: Optical Absorption of solutions containing dye detached from doctor bladed films of different cases of interest (film area of 1.6 $cm_2$ dye extracted in 10 mL of 1 mM KOH).
Figure 14A:
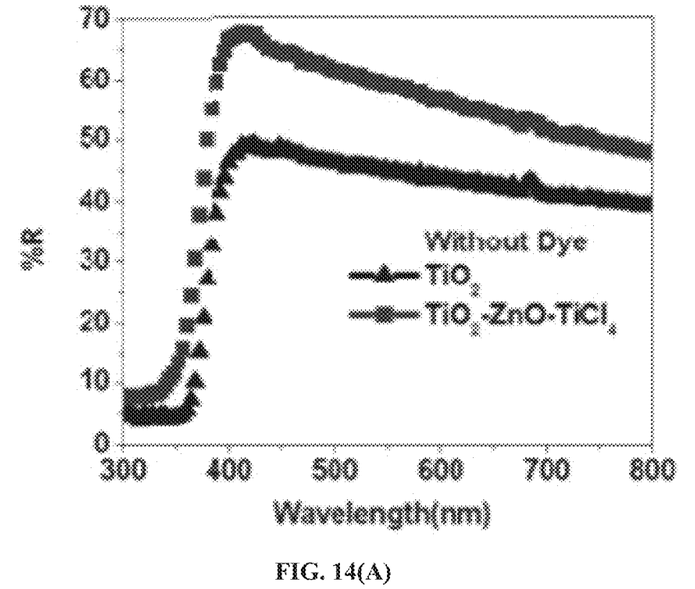
FIG. 14: Diffused reflectance spectra of the nanocrystalline $TiO_2$ and TZFT films (A) without and (B) with adsorbed N-719 dye.

In order to quantify the amount of dye adsorbed measured the absorptions of solutions containing dye (see FIG. 13) detached from the TiO$_2$ and TZFT films. From FIG. 13 calculate the dye loading of the TiO$_2$ and TZFT films, which have values of $8.9 \times 10^{-8}$ and $4.7 \times 10^{-8}$ mol/cm$^2$, respectively. It is interesting that although the dye loading of the TZFT film is far less (by almost 50%) as compared to the TiO$_2$ nanocrystalline film, still the current density for TZFT remains the same (~14 mA/cm$^2$). In order to investigate this aspect further measured the diffused reflectance spectra (DRS) for the TiO$_2$ and TZFT films without dye. It is observed (FIG. 14(A)) that the (diffused) reflectance of TZFT film is higher than that of nanocrystalline TiO$_2$ film. This implies improved scattering of TiO$_2$ Flrs (over layer) formed after TiCl$_4$ treatment of ZnOFlrs which enhances the path length of light within the nanocrystalline TiO$_2$.

Figure 14B:
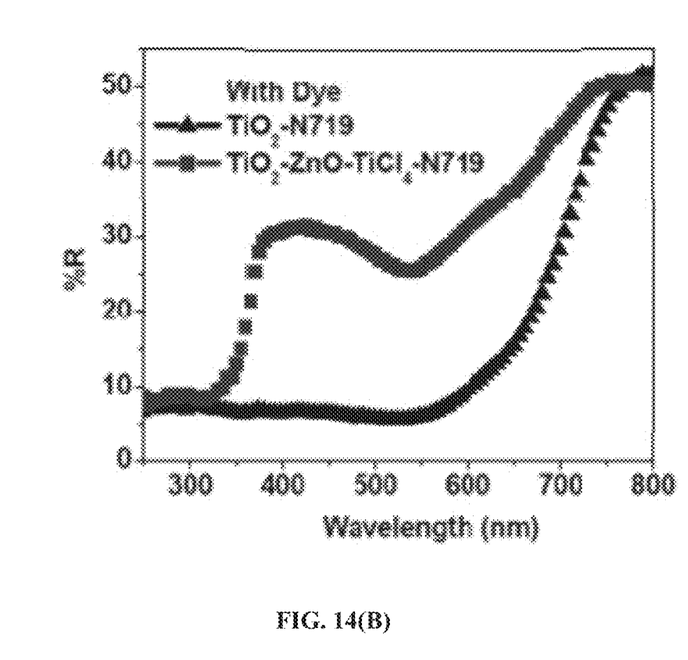

Since the DSSC systems contain dye adsorbed films, the DRS of dye adsorbed films was recorded for gaining further insights. As shown in FIG. 14(B), after dye adsorption on the films the reflectance values for the TZFT and the nanocrystalline TiO$_2$ film decrease significantly, which is mainly due to light absorption by the dye molecules. However, the dye-adsorbed TZFT film exhibits a substantially higher reflectance than the dye adsorbed nanocrystalline TiO$_2$ film which is due to low dye adsorption of the TZFT film (as discussed earlier) and the strong light scattering effect of the over layer of TiCl$_4$ treated ZnOFlr on the first layer of TiO$_2$ nanoparticle (TZFT film). This shows that the decrease in current density due to less dye adsorption is counterbalanced by the enhancement in current density due to improved light scattering effect of TiO$_2$ Flr over layer in TZFT films thereby keeping current density almost the same. Therefore, the enhancement of efficiency in TZFT films can be attributed to both increase in VOC and improved light scattering effect within the film.

EXAMPLES

The following examples are given by way of illustration therefore should not be construed to limit the scope of the invention.

Example 1

Shape preserving chemical transformation of ZnO mesostructures into anatase TiO$_2$ mesostructures is prepared by providing films of ZnO mesostructures grown on FTO/ITO glass* plates and treating the said films with TiCl$_a$ solution at 70° C. for about 30 min, followed by washing with D.I. water followed by annealing at 450° C. for 30 min to obtain anatase TiO$_2$ mesostructures. The thickness of these films is ~5 μm.

Example 2

Shape preserving chemical transformation, of ZnO mesostructures into anatase TiO$_2$ mesostructures is optionally prepared by coating a layer of ZnO mesostructures over TiO$_2$ nanoparticles film which is subjected to annealed at 450° C. for 60 min and these films are further treated with TiCl$_4$ solution at 70° C. followed by second annealing at 450° C. for 30 min to obtain TiO$_2$ mesostructures (flowers) of the thickness of 11 μm.

The first layer of TiO2 nanoparticles is ~6 μm and on that anatase TiO2 mesostructure (obtained from ZnO mesostructures) of thickness 5 μm was coated. Therefore total thickness was 11 μm.

Example 3

Experimental Details

Materials:
The chemical agents were purchased from Aldrich Co. and Merck Chemicals. The RuL$_2$(NCS)$_2$/(TBA)$_2$ (N719Dye; L=2,2'-bipyridine-4,4'-dicarboxylic acid and TBA=tetrabutyl ammonium) and the fluorine-doped SnO$_2$ (FTO) electrode (sheet resistance 15 ohm/square) were purchased from Solaronix Co. For the preparation of reference DSSCs, commercial TiO$_2$ was obtained from Degussa (P25). High-purity water (Milli-Q, Millipore) was used for all experiments. The FTO electrodes were washed with acetone, ethanol, and deionized (18.2 MΩ·cm) water in an ultrasonication bath for 15 min with a final wash in isopropyl alcohol.

Example 4

Preparation of ZnO Flowers

The ZnO flowers used in the present invention were synthesized by hydrothermal route using high purity zinc acetate and NaOH. For obtaining ZnO flower, a 150 ml, 0.01 M aqueous solution of zinc acetate was prepared and magnetically stirred for 10 min. After the dissolution of zinc acetate, 6 ml of 6.67 M aqueous solution of NaOH was added to the above solution. This solution was transferred into a Teflon lined stainless steel autoclave. It was then sealed and maintained at 180° C. for 2 h. After the reaction a white colored solid powder was recovered by centrifugation followed by washing with distilled water and ethanol to remove the residual ions in the final product. Then the powder was finally dried at 60° C. in air for 5 h.

Example 5

Preparation of ZnO Rods on FTO and ITO

Zinc acetate, Zinc nitrate, Hexamethylenetetramine (HMT) and Sodium Hydroxide Pellets were used as precursors for ZnO rod growth. Zinc acetate solution (5 mM concentration) was prepared in methanol and was kept under stirring at 65° C. for 45 min. Then sodium hydroxide solution (30 mM concentration, prepared in Methanol) was added drop wise till the solution attained slight milky color and was used as seed solution. Fluorine doped tin oxide (FTO) and Indium doped tin oxide (ITO) glass plates (2.5 cm×2.5 cm) were used as substrates for growth of ZnO rods. The substrates were mounted on the spin coater having a preset rotation speed of 2500 rpm for 30 sec and then spin coating was carried out using freshly prepared seed solution. The process was repeated continuously until the transparent substrate turned slightly opaque. Finally the substrates were annealed at 300° C. for 1 hr for better adherence of ZnO nanoparticles which act as nucleating sites for the growth of ZnO rods.

For facile growth of ZnO rods, equimolar solutions of Zinc Nitrate (25 mM) and hexamethylene tetramine (HMT 25 mM) were separately prepared using de-ionized water as solvent. The seeded substrates were immersed into the solution and the solution temperature was maintained at 95° C. under slow stirring. The depositions were carried out for time duration of 3 hour. Finally, the deposits were annealed at 300° C. for 1 hr. for removal of moisture and for improving the adhesion.

Example 6

Preparation of ZnO Spheres and Flakes

The ZnO sphere like morphology was synthesized at room temperature by co-precipitation method using zinc acetate, polyvinyl pyrrolidone and sodium hydroxide 0.02M aqueous solution of zinc acetate was prepared and magnetically stirred for 5 minutes. 0.5 gm of polyvinyl pyrrolidone (capping agents) was dissolved in 10 ml of deionized water and added to the zinc acetate solution. Then 10 ml of 2M aqueous solution of NaOH was added drop wise to the above solution. A white colored solid powder was obtained and recovered by centrifugation followed by washing with de-ionized water. Then, the powder was finally dried at 60° C. in air for 10 h. The ZnO flakes were obtained from a commercial source (Smart NanoZ, Pune, India).

Example 7

Preparation of $TiO_2$ Nanoparticles

Nanocrystalline $TiO_2$ was prepared by using a simple hydrothermal method. 2 ml of Titanium Isopropoxide was hydrolyzed by adding 100 ml of deionized water and then sonicated for 5 minutes. The solution was transferred to Teflon lined autoclave vessel along with 3 ml of $H_2SO_4$ (1M). This autoclave vessel was kept at 175° C. for 24 Hrs. The resulting product was washed thoroughly with deionized water and dried at 50° C. in adust proof environment to produce the powder of $TiO_2$ nanoparticles.

Example 8

Fabrication of Dye Sensitized Solar Cell

Doctor blading method was employed to first make the $TiO_2$ nanoparticle film (thickness ~7 μm) and then an over layer of ZnO flowers film (thickness ~8 μm). The total thickness of the film was ~15 μm. After making such films they were annealed at 450° C. for 60 min. Then these films were treated with $TiCl_4$ solution (50 mM) at 70° C. followed by second annealing at 450° C. for 30 min. After $TiCl_4$ treatment, the total thickness of the film was found to be reduced from ~15 μm to ~11 μm. Same thickness (~11 μm) of $TiCl_4$ treated $TiO_2$ nanoparticle and P25 (Degussa) films were made for comparison. The films were impregnated with 0.5 mM N719 dye in ethanol for 24 h at 27° C. The samples were then rinsed with ethanol to remove excess dye on the surface and were air-dried at 27° C. This was followed by redox electrolyte addition and top contact of Pt coated FTO as known in the art. The electrolyte used was 1M 1-hexyl-2,3-dimethyl-imidazoliumiodide, 0.05 M LiI, 0.05M I2, and 0.5 M 4-tert-butylpyridine in acetonitrile. The J-V characteristics were measured by exposure to 100 mW/cm² (450 W xenon lamp, Newport Instruments), 1 sun AM 1.5, simulated sunlight by a solar simulator. The current was measured using a Kiethley 2420 source meter.

Example 9

BET Surface Area Data

The BET surface area data on the ZnOFlr system before and after its conversion into anatase $TiO_2$ Flrs is given in Table-1. The area is seen to be enhanced from about 5.9 m2/gm to 30.5 m²/g, i.e. by a factor of about 5. This is consistent with change from a rod to a tube structure which would increase the area by a factor of about 2; the extra multiplying factor being added by the roughness enhancement.

TABLE 1

The BET Surface area measurements of ZnO Flr and $TiCl_4$ Treated ZnO Flr.

| Name | Surface Area(m²/g) |
| --- | --- |
| ZnO Flr | 5.9 |
| $TiCl_4$ treated ZnO Flr | 30.5 |

Example 10

Comparison of Photovoltaic Properties of DSSC

TABLE 2

Photovoltaic properties of dye-sensitized solar cells (DSSC)

| Name | Voc (V) | Jsc (mA/cm²) | Fill Factor (FF) | Efficiency (η)% |
| --- | --- | --- | --- | --- |
| Degussa P25 | 0.67 | 12.9 | 60.5 | 5.2 |
| $TiO_2$ | 0.66 | 14.0 | 58.1 | 5.4 |

TABLE 2-continued

Photovoltaic properties of dye-sensitized solar cells (DSSC)

| Name | Voc (V) | Jsc (mA/cm$^2$) | Fill Factor (FF) | Efficiency (η)% |
|---|---|---|---|---|
| 1$^{st}$ layer TiO$_2$ + 2$^{nd}$ layer TiCL$_4$ treated ZnO Flr (Example 2) | 0.78 | 14.0 | 62.8 | 6.9 |
| The thickness of all films of DSSC were 11 μm. | | | | |
| TiO2 mesostructure from Example 1 | 0.79 | 7.5 | 58.5 | 3.5 |

In Conclusion, ZnO mesostructures (rods, spheres, flakes and flower-like morphologies) are converted to anatase TiO$_2$ mesostructures by a simple TiCl$_4$ treatment and this process exhibits a remarkable nominally shape-preserving property. Thus, for the case of ZnO flowers and spheres, anatase TiO$_2$ flowers and spheres are obtained, respectively, albeit with small changes in morphology details. Interestingly anatase TiO$_2$ hollow rod like structures are obtained by TiCl$_4$ treatment of ZnO rods. Post-treatment appearance of Raman peaks at 148.2, 401, 518 and 642 cm$^{-1}$ that are the characteristics of pure anatase TiO$_2$ phase clearly indicates the complete conversion of ZnO structures to anatase TiO$_2$. It is observed that the morphology conversions of ZnO to TiO$_2$ are due to the ion exchange reaction i.e. between Zn$^{2+}$ and Ti$^{4+}$. These converted TiO$_2$ mesostructures are used for light harvesting to absorb more photons from sunlight in Dye-sensitized Solar Cells for better conversion efficiency.

ADVANTAGES OF THE INVENTION

The present process provides synthesis of shape controlled nanomaterials (anatase TiO$_2$) by an easy and economical process The present process provides anatase TiO$_2$ mesostructures without using any selective capping agent.

We claim:

1. A process for the shape preserving chemical transformation of ZnO mesostructures into anatase TiO$_2$ mesostructures comprising the steps of:
   i. treating the Zinc oxide mesostructures with Titanium tetrachloride (TiCl$_4$) solution at temperature in the range of 60 to 70° C. for period in the range of 20 to 30 min;
   ii. annealing the TiCl$_4$ treated Zinc oxide mesostructures as obtained in step (i) at a temperature in the range of 400 to 450° C. for period in the range of 20 to 30 min to obtain anatase TiO$_2$ mesostructures.

2. The process of claim 1, wherein the Zinc oxide mesostructures are selected from the group consisting of Zinc oxide rods, Zinc oxide spheres, Zinc oxide flakes and Zinc oxide flowers.

3. The process of claim 1, wherein the Zinc oxide mesostructures are coated over Titanium dioxide nanoparticles film and annealed at a temperature in the range of 400 to 450° C. for 50 to 60 min before treating with Titanium tetrachloride (TiCl$_4$) solution.

4. The process of claim 1, wherein the Zinc oxide mesostructures are optionally grown on Fluorine doped Tin oxide (FTO) or Indium doped Tin oxide (ITO) glass plates before treating with Titanium tetrachloride (TiCl$_4$) solution.

5. The process of claim 4, wherein the Zinc oxide mesostructures treated with Titanium tetrachloride (TiCl$_4$) solution are washed with deionized water.

6. The process as claimed in claim 1, wherein the thickness of anatase TiO$_2$ mesostructures is in the range of 5-12 μm.

7. The process as claimed in claim 1, wherein the diameter of anatase TiO$_2$ mesostructure is ranging from 500 nm to 2 μm.

8. Anatase Titanium dioxide mesostructures prepared by the process of claim 1.

9. Anatase Titanium dioxide mesostructures as claimed in claim 8, wherein said mesostructures are useful for optoelectronic applications.

10. Anatase Titanium dioxide mesostructures as claimed in claim 8, wherein dye sensitized solar cells utilizing said mesostructures exhibit efficiency in the range of 3.5% to 7%.

* * * * *